United States Patent [19]
Schwartz

[11] Patent Number: 5,079,646
[45] Date of Patent: Jan. 7, 1992

[54] OPTICAL COUPLING DEVICE
[75] Inventor: Gerald Schwartz, Wilderville, Oreg.
[73] Assignee: Applied Laser Systems, Inc., Long Beach, Calif.
[21] Appl. No.: 549,922
[22] Filed: Jul. 9, 1990
[51] Int. Cl.⁵ .............................................. G02B 7/00
[52] U.S. Cl. ...................................... 359/894; 359/819
[58] Field of Search ............ 350/319, 255, 252, 96.15, 350/96.17, 96.18, 96.2, 96.21, 96.22, 537, 518

[56] References Cited
U.S. PATENT DOCUMENTS

| | | | |
|---|---|---|---|
| 2,844,992 | 7/1958 | Bernhardt | 359/819 |
| 3,048,079 | 8/1972 | Dine et al. | 359/819 |
| 3,558,220 | 1/1971 | Werner | 359/894 |
| 4,215,916 | 8/1980 | Bell et al. | 359/894 |
| 4,643,523 | 2/1987 | Smedley et al. | 359/894 |

Primary Examiner—Loha Ben
Attorney, Agent, or Firm—LaValle D. Ptak

[57] ABSTRACT

A compression coupling system is employed for attaching one optical or electro-optical component to another in a manner such that different diameters of devices readily may be coupled together without causing any cosmetic defects from the coupling function. The first component to which the other component is to be attached has a cylindrical portion on it; and the other component has a hollow cylindrical extension on it, with an internal diameter which is equal to or greater than the external diameter of the first component. A cylindrical sleeve/shim having a thickness which is equal to the difference between the external diameter of the first component and the internal diameter of the extension is placed between the two devices which then are fitted, one over the other. A compression ring and locking ring secure the devices together by compressing the locking ring onto the body of the first component.

8 Claims, 1 Drawing Sheet

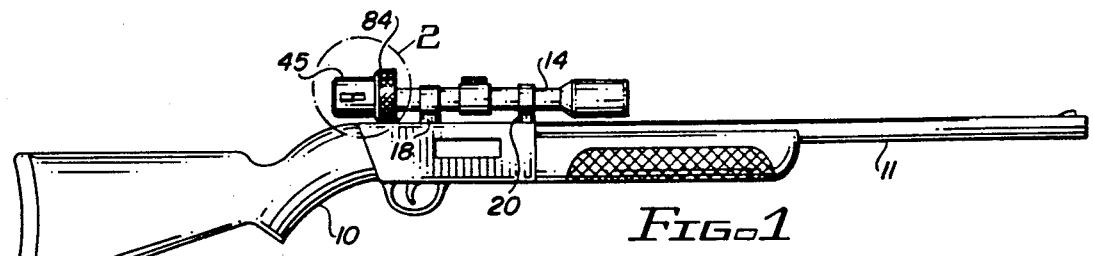
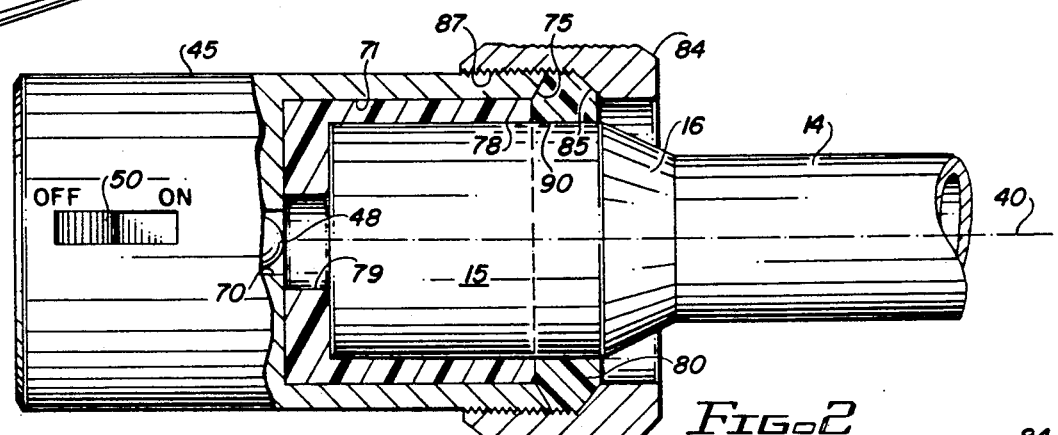
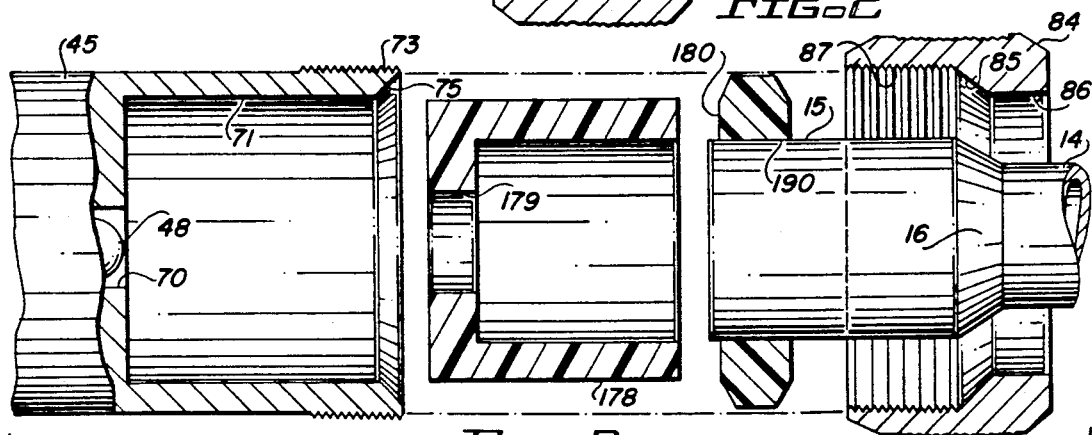
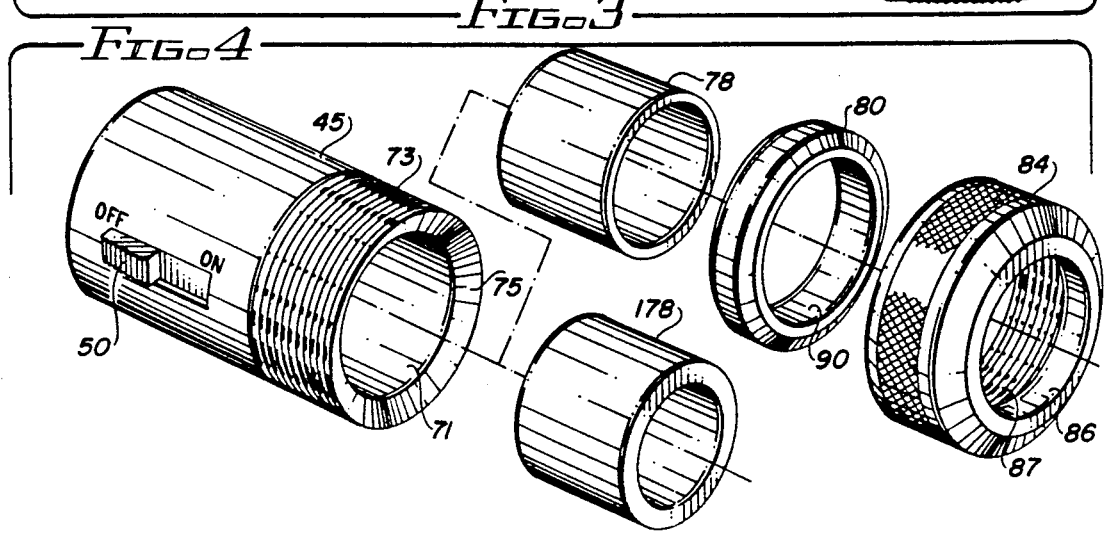

OPTICAL COUPLING DEVICE

BACKGROUND

Optical telescopes are used in a variety of different applications. These applications primarily are for daytime use under natural lighting conditions and permit the user to discern greatly magnified, but narrow field of view, images as a result of use of the telescope. Typically such telescopes have an eyepiece located near the eye of the user; and the optics of the telescope are selected to cause the focal plane and the optical axis of the telescope to intersect at the location of the eye of the user. Focusing adjustments are provided to individualize this location for most telescopes.

A special application of telescopes is in the form of telescope sights for rifles or other weapons. Such telescope sights typically are mounted on top of the barrel of the rifle or other weapon to permit accurate sighting of the rifle for distant targets. Usually such a telescope sight includes a superimposed fine cross hair which intersects on the optical axis of the telescope for designating the location of the target. Since the optical axis essentially is straight, a telescope sight includes an adjustment which may be made to compensate for the trajectory characteristics of the bullet from the rifle at the particular range or distance at which the target appears. When this adjustment is made, the cross hairs in the telescope theoretically coincide with the termination point of the bullet at the target. For most daytime use, this is sufficient for relatively accurate use of the weapon by a hunter or target shooter once the use of the telescope on the rifle has been mastered.

A significant shortcoming of optical telescope sights, however, exists for use of a rifle equipped with such a telescope sight in poor lighting conditions or at night. The light gathering capabilities of telescopes are limited; and, as a consequence, optical telescopes are practically worthless for any night time use. To compensate for this disadvantage, point source laser light transmitters have been developed for attachment to a rifle or other weapon in addition to the optical telescope. The laser emits a narrow beam or pencil of light. When this additional laser light source is calibrated to the trajectory of the weapon, it impinges upon or identifies the target of interest.

For use at night, a laser light source operating in the infrared region may be employed. The user of a rifle or other weapon provided with such equipment then must wear some type of night vision image enhancement equipment, such as conventional night vision goggles. With this equipment, the user may utilize the laser light source and the telescope to observe the target. This equipment is highly effective, but the additional laser light source in a separate housing typically is very expensive, because of the additional optics required in conjunction with the laser light source. In addition, the alignment of the weapon now requires three separate systems to be aligned, namely, the optical telescope, the laser source, and the trajectory of the bullet. This in turn, also makes the use of the weapon more difficult.

Apparatus has been developed where a separate laser light source is placed in a housing, which in turn is attached to the left-hand or eyepiece end of the telescope sight by means of mating threads on the housing and the eyepiece end of the telescope sight. This then places a point light source or collimated light source in alignment with the optical axis of the telescope sight and significantly facilitates alignment of the weapon and utilization of the weapon at night. Arrangements can be made for permitting conventional optical use of the telescope sight alternately with, or simultaneously with, utilization of the laser light source projected through the telescope sight toward the target.

In such apparatus, the mechanical coupling of one optical, or electro-optical component to another, is accomplished by means of a screw mount arrangement or a bayonet mount arrangement. Screw-mounts or bayonet mounts have been used for optical mechanical coupling of different components to one another, since these mounts provide optically reliable coupling between the two components which are interconnected with them. Couplings of this type are used to interchange various lenses in 35 MM camera bodies, or the optical-mechanical coupling of an image intensifier to an electronic camera or standard photographic camera. When such screw-type or bayonet mount coupling is employed, it is necessary that the two components are fully compatible with each other, that is, the mounts must accurately mate. This means that a fixed diameter is necessary, and that the same type of mount is necessary for both components. Consequently, such mounts are not universal or interchangeable with different diameter units or different types of units.

It is desirable to provide an optically reliable mount which is of reasonably low cost and further which is universal in application for use to couple devices of the type disclosed in the above-mentioned co-pending applications, and other optical or electro-optical components, to one another.

SUMMARY OF THE INVENTION

Accordingly, it is an object of this invention to provide an improved coupling device.

It is another object of this invention to provide an improved optical-mechanical coupling device which is optically reliable.

It is an additional object of this invention to provide an improved optical-mechanical coupling device which is easy to use, optically reliable, and capable of use with components of different diameters.

It is a further object of this invention to provide an improved optical-mechanical coupling system which is simple to use and which utilizes simple subassemblies to couple and align one optical device with another.

In accordance with a preferred embodiment of this invention, an optical-mechanical coupling device comprises a housing with an open sleeve at one end. The internal diameter of the open sleeve is selected to be greater than the external diameter of the optical device to which the component is to be coupled. The open end of the housing is fitted over the exterior of the device to which it is to be coupled, and a locking ring is used to distort and tighten a compression ring onto the external diameter of the device over which the housing open end is placed. This centers and aligns the central or optical axes of the coupling device and optical device as the locking ring is tightened onto the open sleeve of the housing.

BRIEF DESCRIPTION OF THE DRAWINGS

FIG. 1 is an illustration of a rifle with a telescope sight on it to which a preferred embodiment of the invention has been attached;

FIG. 2 is an enlarged, partially cut-away view of the portion of the device circled in FIG. 1;

FIG. 3 is an exploded view of an alternate arrangement of components of the type shown assembled in FIG. 2; and FIG. 4 is a perspective, exploded view of the device shown in FIGS. 2 and 3.

DETAILED DESCRIPTION

Reference now should be made to the drawing in which the same reference numbers are used throughout the different figures to designate the same components. To facilitate an understanding of the invention and one example of its use, reference first should be made to FIG. 1. FIG. 1 is an illustration of a telescope-equipped rifle 10 which has a barrel 11. The rifle 10 may be operated in a conventional manner. The rifle 10 is illustrated as equipped with a telescope sight 14 having an eyepiece 15 (best shown in FIG. 2) attached to its rear end or left-hand end and mounted on the rifle 10 through a pair of adjustment mountings 18 and 20.

The mountings 18 and 20 permit the optical axis of the telescope 14 to be placed relative to the central axis of the barrel 11 of the rifle 10. This is done to compensate for the trajectory of bullets fired from the barrel of the rifle 11. Typically, adjustments are made by first sighting through the telescope 14 and then firing the rifle at a target located a desired distance from the rifle. The telescope 14 then is adjusted, as needed, until the cross hairs of the telescope 14 intersect a target (not illustrated) at the same point where bullets fired from the rifle 11 also intersect the target.

The telescope 14 of the rifle 10 may be utilized to project light outwardly along its optical axis from a point light source or collimated light source, preferably provided by a laser, mounted in a housing 45 which is placed on the end of the telescope over the eyepiece end. Light from the light source within the housing 45 then is projected directly on the optical axis 40 of the telescope 14 through the internal lens system. As a consequence, the light does not undergo any distortion, but it is projected as a small circular beam of practical or minimal divergence in the direction the telescope 14 is pointed. This spot of light may be projected in any desired size to a distance which is well beyond the range of most hand-held weapons. Typical light sources, as mentioned, may be either an infrared or visible light emitting diode (LED) or an infrared or visible laser.

FIG. 2 illustrates such a light source housed in a housing 45 which is quickly and easily attached to and detached from the eyepiece end of the telescope 14 without requiring the utilization of typical screw-type or bayonet type mating interconnections to accomplish the purpose.

Generally, the eyepiece end of a telescope, such as of the type used with the rifle as shown in FIG. 1, is of an elongated cylindrical shape which is of a greater external diameter than the main body portion of the telescope 14. The telescope diameter, however, could be constant throughout the length of the telescope 14. In order to couple the housing 45, for the laser or LED light source 48 located within it, onto the eyepeice end 15 of the telescope 14, the housing 45, shown in FIG. 2, is extended toward the right with a hollow cylindrical extension 71, shown most clearly in FIGS. 2 and 3. This portion 71 extends beyond the opening 70 through which the light souce 48 projects.

The internal diameter of the hollow extension 71 is selected to be greater than the external diameter of the largest device onto which the housing 45 is to coupled. For example, as shown in both FIGS. 2 and 3, the internal diameter of the portion 71 is greater than the external diameter of the eyepiece portion 15 of the telescope sight mounted on the rifle 10.

The housing 45 also includes the necessary power supply and circuitry for operating the light source 48. Also, as shown in FIG. 2, an off/on switch 50 is provided to turn on and off the energizing circuit for the light source, as desired.

The difference between the external diameter of the eyepiece portion 15 of the telescope 14 and the internal diameter of the extension 71 is accommodated or taken up by an insert sleeve 78 (FIG. 2) which is in the form of a generally open-ended cup-shaped cylindrical shim made of suitable plastic material. This sleeve 78 has an opening 79 in it, which is at least as large as the opening 70 in the housing 45, to permit unobstructed projection of light from the light source 48 through the opening 79.

When the housing 45 is to be mounted on the eyepiece end 15 of the telescope, a sleeve/shim 78, having the appropriate thickness to provide a snug fit, is placed in the open end of the extension 71, as shown in FIG. 2. A locking ring 84 is placed over the eyepiece end 15 of the telescope 14. This locking ring 84 has internal threads 87 on it for engaging external threads 73 on the extension 71 of the housing 45. Next, a resilient circular generally donut-shaped, compression ring 80 is placed over the eyepiece end 15 of the telescope. The compression ring 80 is designed to have a flat inner surface 90 which snuggly engages the external diameter of the eyepiece end 15 of the telescope sight. The opposite outer edges of the compression ring 80 are beveled at approximately a 45° angle, as shown most clearly in FIG. 2. This angle engages a similar angle in the locking ring 84 on one side and the beveled edge 75 of the extension 71 on the housing 45 on the opposite side.

After the locking ring 84 and the compression ring 80 are placed on the eyepiece end 15 of the telescope sight, the housing 45 with the sleeve/shim 78 is pressed onto the eyepiece end 15 until the bottom of the cup-shaped sleeve 78 presses against the left-hand end of the eyepiece 15, as shown in FIG. 2. When this has been accomplished, the locking ring 84 is tightened onto the end of the extension 71. This causes the 45° angled beveled face 75 on the end of the projection 71 and the beveled face 85 on the inside the locking ring 84 to move toward one another to squeeze and distort the resilient compression ring 80. This causes the surface 90 of the ring 80 to be pressed tightly onto the outer surface of the eyepiece end 15 of the telescope to hold the entire assembly tightly in place. It should be noted that the arrangement maintains the center of the light source 48 on the optical axis 40 of the telescope 14.

FIG. 3 illustrates, in an exploded view, the housing 45 and extension 71, and the locking ring 84 in position for placement on a smaller external diameter telescope eyepiece 15, than the one shown in FIG. 2. To permit placement of the device on such a smaller eyepiece 15, a sleeve/shim 178 having the same external diameter as the sleeve 78 of FIG. 2 is used. The sleeve 178, however, has a smaller internal diameter, which is equal to the external diameter of the eyepiece end 15 of the telescope 14 on which it is to be placed. This sleeve/shim 178 is otherwise of the same configuration as the sleeve 78, as shown in FIG. 2. It has a circular opening 179 in the bottom or left-hand end to fit around the opening 70 in the end of the housing 45 in the same manner as the sleeve 78 described above in conjunction with FIG. 2. A compression ring 180, having a flat circular interior 190 and opposite 45° beveled edges, similar to the ring 80, is employed in the device of FIG. 3. The ring 180 is thicker than the ring 80, however. When the device of FIG. 3 is assembled together in the manner of the device of FIG. 2, the compression ring 180 causes the assembly to tightly engage the eyepiece 15 of the telescope to align the assembly with the optical axis 40 of the telescope in the same manner described above in conjunction with FIG. 2.

FIG. 4 is an exploded perspective view of the device of FIG. 2, also showing the optional sleeve 178. FIG. 4 illustrates the manner in which the various parts are assembled together to attach the housing 45 to the end of the telescope eyepiece 15 in the manner described previously in conjunction with FIGS. 2 and 3.

It should be noted that other sleeve/shim may be provided to accommodate various external diameter eyepieces 15 for the telescope sights or other devices on which the apparatus 45 is to be mounted. The manner in which the mounting is effected, however, is the same as described above in conjunction with FIGS. 2, 3, and 4. It also is apparent from the foregoing description that the mounting which is effected does not mar the external finish of the eyepiece 15 in any way, since the plastic sleeve/shim 78 or 178, and the compression ring 80 or 180, are made of non-marring plastic materials. Obviously, the shims 78 and 178 are made of relatively rigid material, while the compression rings 80 and 180 are made of more resilient compressible material, as described above. Within these parameters, however, the actual materials used for the various parts may be selected from a wide range of commercially available materials which exhibit the desired characteristics.

It also should be noted that the sleeve 78 and the compression ring 80, or the sleeve 178 and the compression ring 180, may be manufactured as single units. In such a case, the entire unit is made of relatively resilient plastic or rubberlike material; and because of the shape of the compression ring portion 80 or 180, this portion only is distorted to grip the external diameter of the eyepiece 15.

Although the foregoing embodiment of the invention is described as being utilized to optically couple a laser light source, or other suitable point light source, to the eyepiece end of a rifle telescope sight, other applications of the coupler device may be made. For example, the coupling device may be utilized to couple different filters or lens systems to camera bodies or to interconnect other types of optical devices to one another in a manner which insures that the optical axes of the devices being coupled are aligned with one another.

Various changes and modifications will occur to those skilled in the art without departing from the true scope of the invention which is defined in the appended claims.

I claim:

1. A device for coupling a second optical component to a first optical component, wherein said first optical component is mounted in a first housing having a cylindrical portion of a predetermined external diameter extending therefrom, said device including in combination:

a second housing for said second optical component, said second housing having a hollow cylindrical extension thereon, the internal diameter of which is at least equal to said predetermined external diameter of said cylindrical portion of said first housing, said hollow cylindrical extension of said second housing being placed over and surrounding said cylindrical portion of said first housing;

a hollow cylindrical sleeve/shim having a thickness which is equal to the difference between the external diameter of said cylindrical portion of said first housing and the internal diameter of said hollow cylindrical extension of said second housing, said sleeve/shim being located between said cylindrical portion of said first housing and said hollow extension of said second housing, with said hollow extension of said second housing being placed over said cylindrical portion of said first housing, whereby said cylindrical portion of said first housing and said hollow extension of said second housing become axially aligned with each other; and means for resiliently and releasably securing said cylindrical portion of said first housing and said hollow extension of said second housing together.

2. The combination according to claim 1, wherein said securing means comprises a resilient compression ring held in compression contact with said extension on said second housing and the exterior surface of said cylindrical portion of said first housing.

3. The combination according to claim 1, wherein said securing means comprises a compression ring means having an internal diameter substantially equal to the external diameter of said cylindrical portion of said first housing; wherein said hollow cylindrical extension of said second housing has an open end and a substantially closed end; and said compression ring means abuts the open end of said hollow extension of said second housing; and further including a locking ring means extending over and engaging said compression ring means and coupled with said hollow extension of said second housing for compressing said compression ring means and simultaneously forcing said compression ring means into tight engagement with said cylindrical portion of said first housing.

4. The combination according to claim 3, wherein said compression ring means has opposing outer edges thereof beveled at a predetermined angle, and wherein the end of said hollow cylindrical extension of said second housing has a first corresponding mating bevel and said locking ring has a second corresponding mating bevel for engaging opposite sides of said compression ring means when said locking ring means is secured to said hollow extension of said second housing.

5. The combination according to claim 4, wherein said locking ring means and said hollow cylindrical extension of said second housing have mating releaseable securing means thereon for tightly engaging said compression ring means in one position thereof and for releasing said compression ring means in a second position thereof, for correspondingly attaching and releasing said second housing from said cylindrical portion of said first housing.

6. The combination according to claim 5, wherein said mating releasable securing means comprises an external threaded portion on said hollow cylindrical extension of said second housing and a mating internal threaded portion on said locking ring means.

7. The combination according to claim 6, wherein the axis of the cylindrical portion of said first housing comprises the optical axis of component mounted in said first housing, and the axis of said hollow cylindrical extension of said second housing comprises the optical axis of component mounted in said second housing.

8. The combination according to claim 1, wherein the axis of the cylindrical portion of said first housing comprises the optical axis of component mounted in said first housing, and the axis of said hollow cylindrical extension of said second housing comprises the optical axis of component mounted in said second housing.

* * * * *